(12) United States Patent
Shibayama et al.

(10) Patent No.: US 11,687,357 B2
(45) Date of Patent: Jun. 27, 2023

(54) VIRTUALIZATION SYSTEM AND OPERATION MANAGEMENT METHOD

(71) Applicant: RENESAS ELECTRONICS CORPORATION, Tokyo (JP)

(72) Inventors: Tetsuya Shibayama, Tokyo (JP); Nhat Van Huynh, Tokyo (JP); Katsushige Matsubara, Tokyo (JP); Seiji Mochizuki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 283 days.

(21) Appl. No.: 17/064,341

(22) Filed: Oct. 6, 2020

(65) Prior Publication Data
US 2021/0132978 A1 May 6, 2021

(30) Foreign Application Priority Data
Nov. 5, 2019 (JP) .................. 2019-200651

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01)

(58) Field of Classification Search
CPC .................................................. G06F 9/45558
USPC .......................................................... 718/1
See application file for complete search history.

(56) References Cited

U.S. PATENT DOCUMENTS

| 8,775,696 B2* | 7/2014 | Scales ................ H04L 67/1097 |
| | | 710/37 |
| 2004/0040025 A1* | 2/2004 | Lehtinen .............. G06F 9/4881 |
| | | 718/104 |
| 2006/0029226 A1* | 2/2006 | Han ..................... H04L 9/0822 |
| | | 380/44 |
| 2015/0270956 A1* | 9/2015 | Basmov ................. G06F 21/74 |
| | | 713/189 |
| 2016/0092677 A1* | 3/2016 | Patel ..................... G06F 21/55 |
| | | 726/23 |
| 2016/0179561 A1* | 6/2016 | George ................... G06F 8/61 |
| | | 718/1 |
| 2016/0246649 A1* | 8/2016 | Tsirkin ................... G06F 8/654 |
| 2018/0004425 A1* | 1/2018 | Suzuki ................. G06F 3/0607 |
| 2019/0155637 A1* | 5/2019 | Yu ........................ G06F 12/109 |
| 2020/0004936 A1* | 1/2020 | Avital .................... G06F 21/31 |
| 2020/0159940 A1* | 5/2020 | Werner ................. H04L 9/0894 |
| 2020/0241902 A1* | 7/2020 | Freche ............... G06F 9/45545 |
| 2020/0319907 A1* | 10/2020 | Jain ....................... G06F 9/5072 |

(Continued)

*Primary Examiner* — Mehran Kamran
(74) *Attorney, Agent, or Firm* — McDermott Will & Emery LLP

(57) ABSTRACT

In a virtualization system that includes a hypervisor that performs OSID management for linking a plurality of OSs with resources, a guest OS that receives an initial value from the hypervisor and sets a OSID for each resource, and a OSID manager that sets a OSID for each resource, a new OSID created by OSID generator in OSID manager after a certain period of time has elapsed after setting the initial value is set to the guest OS and the IP (resource), and is requested to be updated to a new OSID set by the update controller in OSID manager. This enables simultaneous updating of OSID of the guest operating system and the resources, thus achieving high robustness.

4 Claims, 9 Drawing Sheets

(56) References Cited

U.S. PATENT DOCUMENTS

2020/0394339 A1\* 12/2020 Mayer ..................... G06F 21/74
2021/0132978 A1\* 5/2021 Shibayama ........... G06F 9/5077
2021/0224091 A1\* 7/2021 Hayatnagarkar ... G06F 9/45558

\* cited by examiner

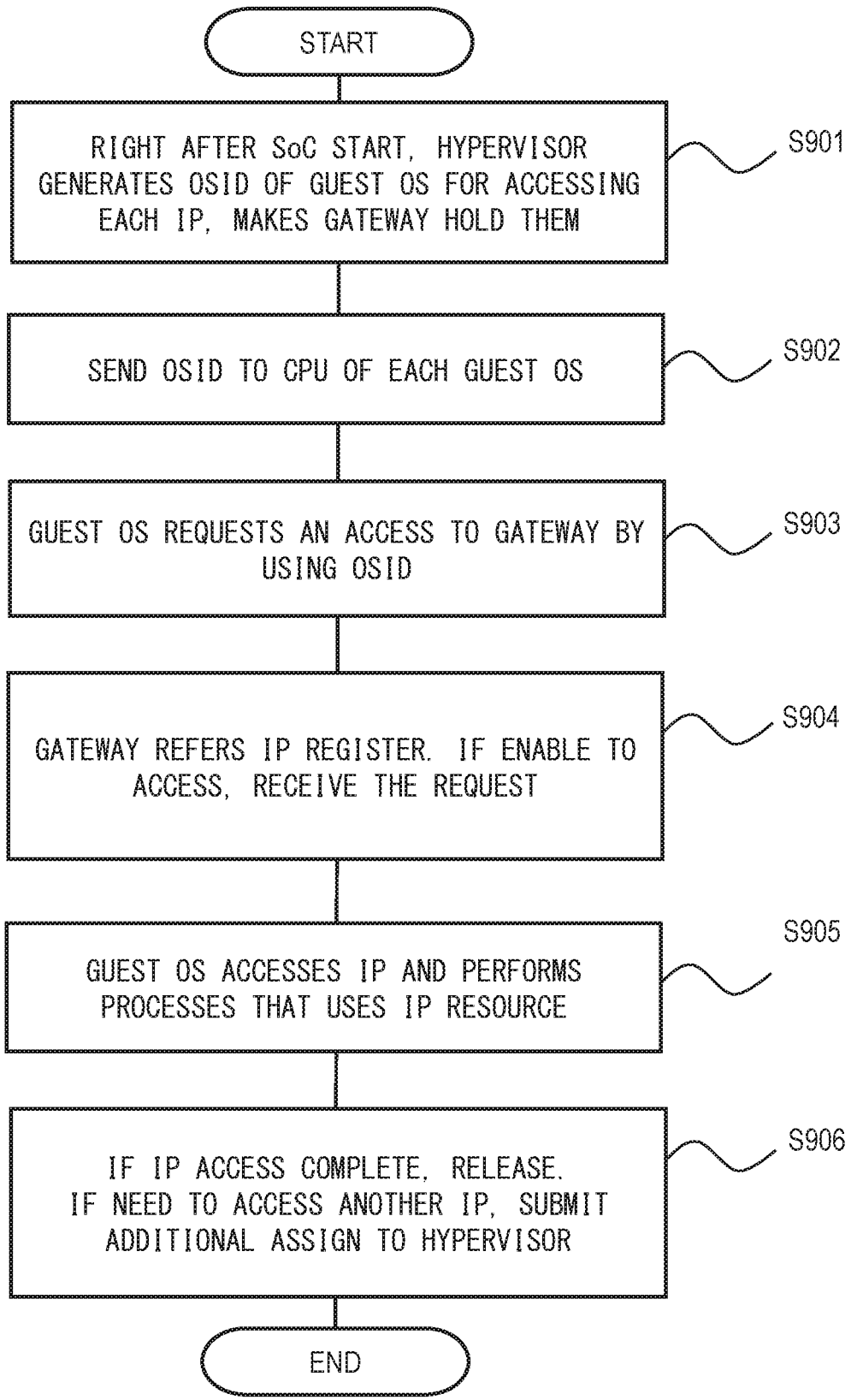

VIRTUALIZATION SYSTEM AND OPERATION MANAGEMENT METHOD

CROSS-REFERENCE TO RELATED APPLICATIONS

The disclosure of Japanese Patent Application No. 2019-200651 filed on Nov. 5, 2019 including the specification, drawings and abstract is incorporated herein by reference in its entirety.

BACKGROUND

The present invention relates to a virtualization system applied to a network-compatible vehicle-mounted system requiring high robustness, an automatic driving system and the vehicle-mounted system such as an ADAS (Advanced Driver Assistance System).

The virtualization technology is a technology for organizing various resources (CPU, memory, storage, Operating System (hereinafter, OS), etc.) of a computer system in a logical unit independent of a physical configuration, so that a plurality of resources can be combined to be shown as a single resource, or a single resource can be divided into multiple resources. In a system environment using such virtualization technology, a virtual machine constructed by software on hardware is started, and the guest OS runs on it. As a method of constructing a virtual machine, there is a method of starting a dedicated software called a hypervisor on a computer and starting an OS on a virtual machine constructed by a hypervisor. The hypervisor manages allocation information indicating the allocation of computer hardware resources (hereinafter referred to as resources) and creates a virtual physical environment. The virtualization systems are implemented on System on Chip (SoC).

To allocate and manage resources to guest OSs running on a virtual environment, each guest OS is given an OSID for identification. If the OSID is flexibly configurable in software without being anchored, the software can be attacked and the OSID can be rewritten freely, and there is a way to hide the OSID in hardware as a way to prevent the OSID from such attacks.

FIG. 8 is a diagram illustrating a system configuration for concealing OSID from software attacks in a virtualization system. It consists of a hypervisor (8c) running on a secure CPU, a guest OS1 (8a) running on a non-secure CPU and a guest OS2 (8d), a register (8b) for storing OSID of the guest OS1 (8a), a register (8e) for storing OSID of the guest OS2 (8d), a gateway (8f), an IP0 (8i) and an IP1 (8j) for accessing resources, a register (8g, 8h) which manages OSID of the guest OS for using IP0 (8i) and IP1 (8j), and a resource (memory, etc.) (not shown).

Referring to FIG. 9, an operation flowchart for hiding OSID from a software-attack is described. The OSID (=A) allocated to the guest OS1 (8a) is generated by the hypervisor (8c) based on the resource map or the like immediately after the startup of the SoC which realizes the virtualization system, and is held by the gateway (8f) with super privileges (S901). Next, the corresponding OSID is written to the register (8b) of CPU0 that runs the guest OS1 (8a) (assuming that the register cannot be directly referenced by another guest OS) with super privileges. The guest OS1 (8a) runs on non-secure CPUs (S902). The guest OS1 (8a) accesses resources through the gateway (8f) using assigned OSID (S903). The gateway (8f) compares OSID requested for access with OSID stored in the register by the register (8g, 8h) that stores OSID permitted for access to the resource, and permits access if it matches. If there is a mismatch, accessing is not permitted (S904). If the guest OS1 (8a) no longer uses the resource or wants to change the resource to be accessed, it requests the hypervisor (8c) to free or reallocate the resource (S905).

As described above, by storing OSID in the registers (8g, 8h) of gateway (8f), the register (8b) of the guest OS1 (8a) and the register (8e) of the guest OS2 (8d) that cannot be referenced by other guest OSs, the OSID is concealed as hardware and a high-security environment in the virtualization system is realized.

SUMMARY

However, the prior art has the following problems. Once OSID has been allocated, the generated OSID will continue to be used while the system is running without modification. In such cases, for example, a malicious guest OS may attempt to access unallocated resources and succeed in accessing them by brute force attack while changing OSID sequentially. To solve this problem, it is possible to change OSID periodically. However, since OSID must be changed while the system is stopped, the system must be stopped and then restarted. In this method, however, it is virtually not possible to change OSID frequently in a short time. Furthermore, even if so as to secure a long change period, the intervention of software is required, it is feared that leads to a decrease in performance.

It is an object of the present invention to realize high security in a virtualization system while reducing the load of software processing on a function that restricts access to resources from a guest OS running on a non-secure CPU.

In a virtualization system having a hypervisor that performs OSID management for linking a plurality of OSs and resources, and an OSID manager that receives an initial value from the hypervisor and sets an OSID for linking in each of the guest OSs and resources, a new OSID created by OSID manager is requested to be updated to the guest OS and resources after a certain period of time has elapsed after the initial value is set. This allows the guest OS and resource OSID to be updated at the same time.

In a virtualization system according to an embodiment, by periodically creating an OSID by OSID manager and resetting OSID created in the guest OS and the resource, OSID that was previously operated at a fixed value can be updated while the system is running. Further, by simultaneously updating by the update controller in OSID manager, it is possible to reliably update OSID while preventing mismatches generated by the deviation of the update. This ensures that if a OSID is stolen in the event of a brute force attack by a malicious OS, OSID is updated immediately, thus invalidating the stolen OSID and enabling a more robust system.

BRIEF DESCRIPTION OF THE DRAWINGS

FIG. 9 is a flowchart for managing OSID in a conventional virtualization system.

DETAILED DESCRIPTION

First Embodiment

Figure 1:
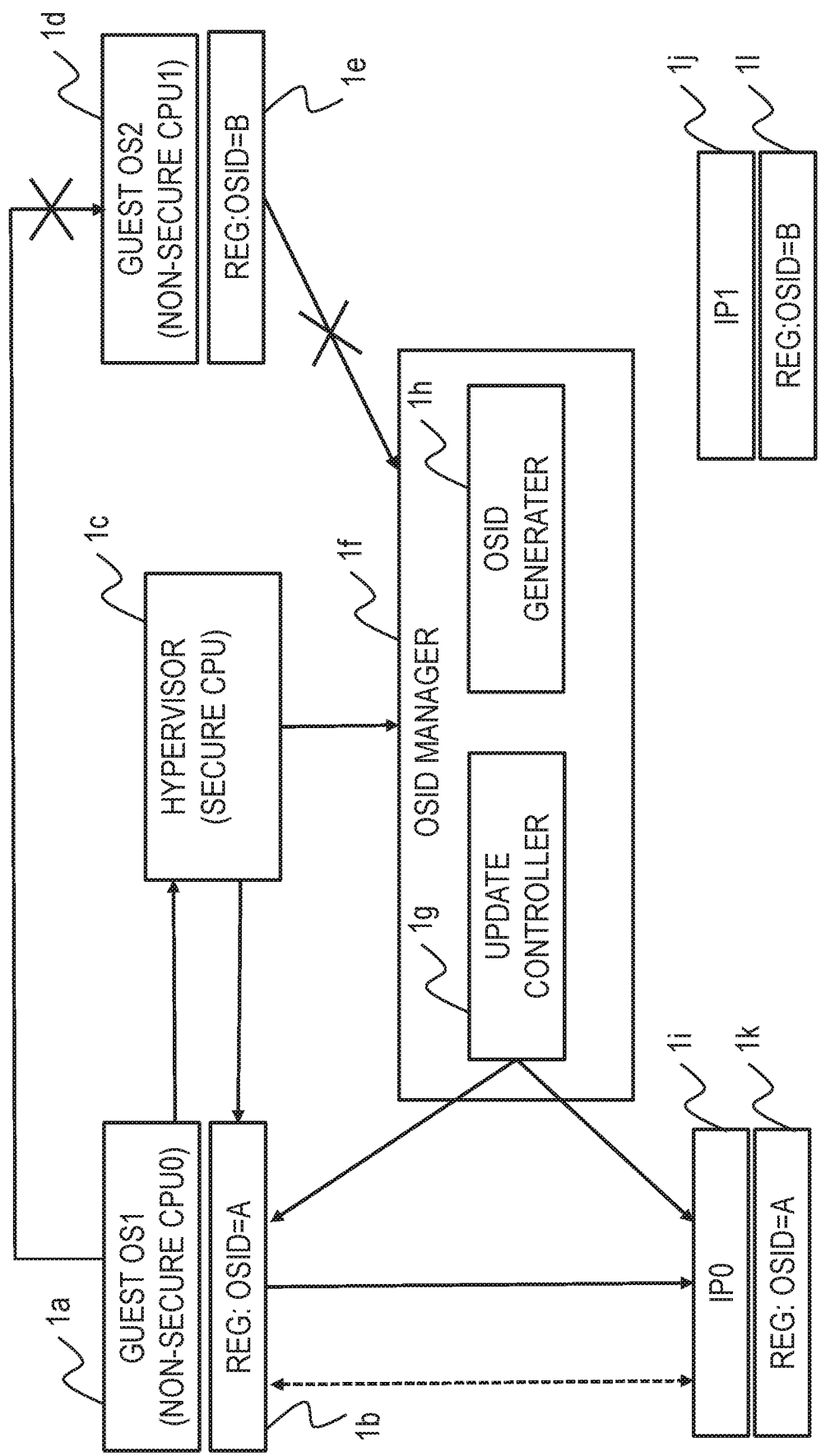
FIG. 1 is a configuration diagram of a virtualization system according to the first embodiment.

Hereinafter, the virtualization system according to the first embodiment will be described in detail with reference to the drawings. In the specification and the drawings, the same or corresponding elements are denoted by the same reference numerals, and a repetitive description thereof is omitted. In the drawings, for convenience of description, the configuration may be omitted or simplified. Also, at least some of the embodiments and each modification may be arbitrarily combined with each other.

(Configuration of Virtualization System)

FIG. 1 is a block illustrating an overall configuration of a virtualization system according to the first embodiment. The virtualization system runs multiple guest OSs on a virtual environment. The virtualization system consists of a hypervisor (1*c*) running on a secure CPU (central processing unit), a guest OS1 (1*a*) and a guest OS2 (1*d*) running on a non-secure CPU, a register (1*b*) that stores OSID of the guest OS1 (1*a*), a register (1*e*) for storing OSID of the guest OS2 (1*d*), an OSID manager (1*f*), an IP0 (1*i*), an IP1 (1*j*), a register (1*k*) used by IP0 (1*i*), a register (1*l*) used by IP1 (1*j*), resources such as memory that are managed by IP0 (1*i*) and/or IP1 (1*j*) (not shown). The hypervisor (1*c*) controls the operation of the guest OS1 (1*a*) and the guest OS2 (1*d*) on the virtual environment, and manages OSID which is the allocation information indicating the allocation of the resources of the virtualization system to the guest OS1 (1*a*) and the guest OS2 (1*d*). The IP0 (1*i*) and the IP1 (1*j*) manage access to resources based on allocation information.

Figure 8:
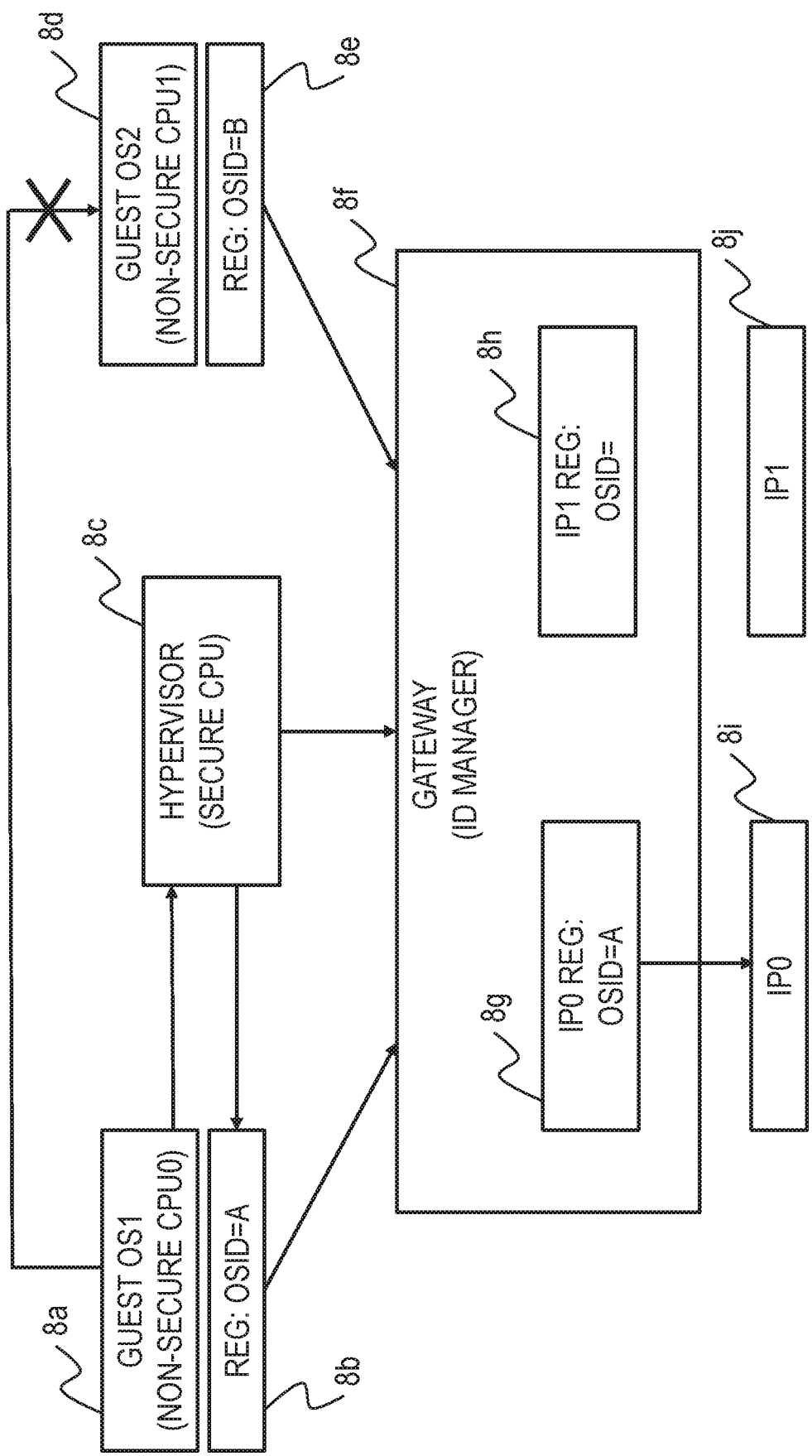
FIG. 8 is a conventional virtualization system configuration diagram.

In the first embodiment, there is an OSID manager (if) as a control unit corresponding to the gateway (8*f*) in the prior art of FIG. 8. The OSID manager (1*f*) has an update controller (1*g*) for generating an OSID and an OSID generator (1*h*). The OSID generator (1*h*) generates OSID allocated to the guest OS1 (1*a*) and the guest OS2 (1*d*). The update controller (1*g*) instructs the guest OS1 (1*a*), the guest OS2 (1*d*), the IP0 (1*i*), and the IP1 (1*j*) to use the update OSID as a new OSID.

(Update Flowchart of OSID)

Figure 2:
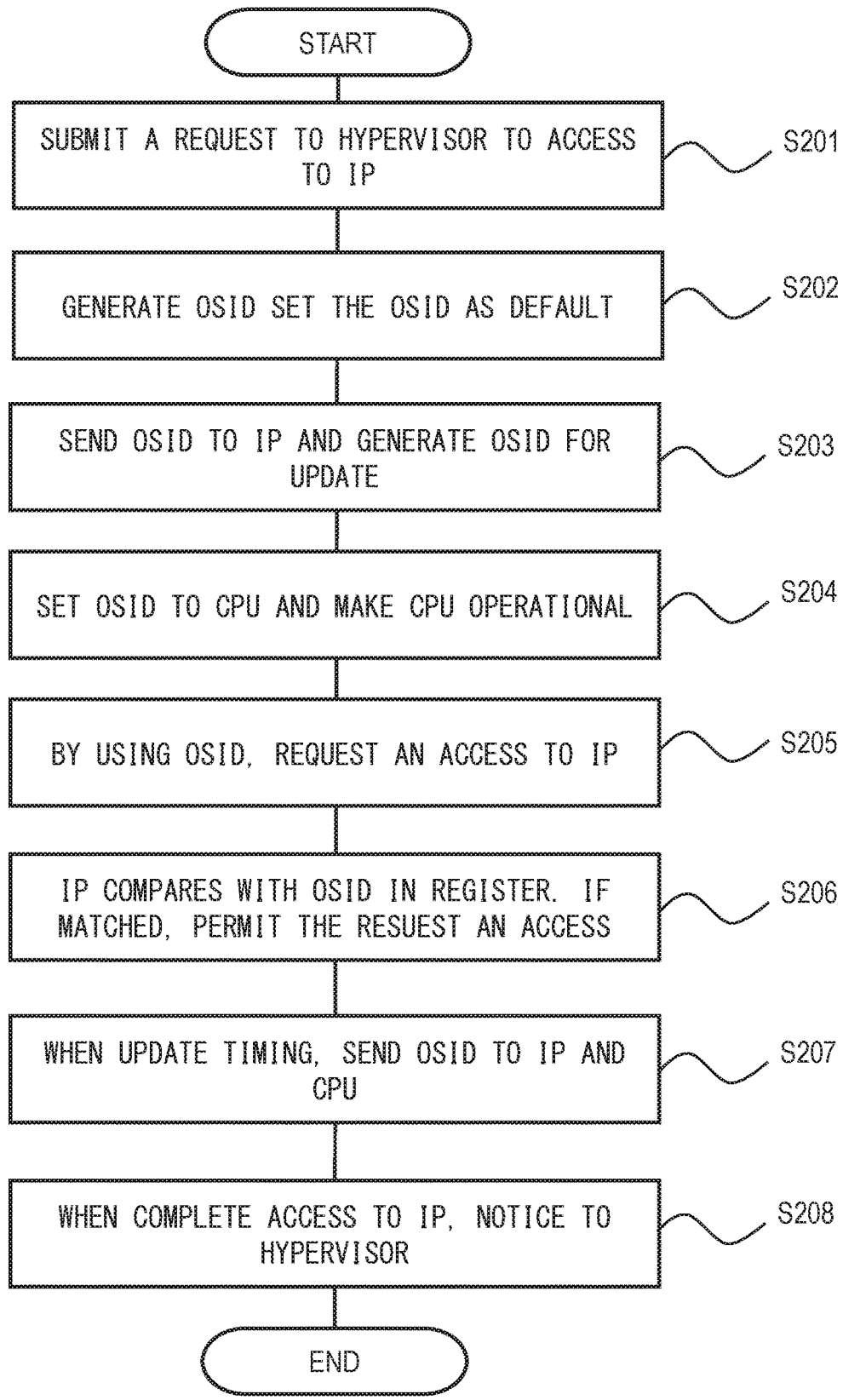
FIG. 2 is a flowchart for updating OSID in the virtualization system according to the first embodiment.

Specifically, with reference to FIG. 2, OSID updating flow in present embodiment is described. A guest OS1 (1*a*) running on a non-secure CPU0 submits a request to the hypervisor (1*c*) to access IP0 (1*i*) that manages the resource (S201). The hypervisor (1*c*) generates OSID of the guest OS for accessing IP, and sets the generated OSID as initial value (S202). For instance, the hypervisor (1*c*) assigns OSID (=A) to the guest OS1 (1*a*). The OSID manager (1*f*) sets initial OSID (=A) set by the hypervisor (1*c*) to IP0 (1*i*), and OSID generator (1*h*) generates a new OSID (=A'). The OSID manager (1*f*) sets OSID assigned to IP0 (1*i*) to CPU0 and makes CPU0 operational (S204).

The guest OS1 (1*a*) uses OSID (=A) set in CPU0 to request access to the resources managed by IP0 (1*i*) (S205). The IP0 (1*i*) permits access to the resource if the access request to the resource from the guest OS1 (1*a*) matches OSID set by OSID manager (if) (S206). If OSID does not matched, access to the resource is not permitted. In this embodiment, OSID (=A) is set in the registers (1*b*, 1*k*) of the guest OS1 (1*a*) and the IP0 (1*i*), so access is accepted. On the other hand, the OSID manager (if) transmits the generated new OSID (=A') to IP0 (1*i*) and CPU0 when the preset update timing (at a predetermined timing) has arrived. Further, the OSID manager (1*f*) instructs IP0 (1*i*) and CPU0 to switch to the transmitted OSID (S207).

Effect of First Embodiment

OSID can be changed frequently even while the system is running, and if the malicious guest OS forges OSID and becomes accessible to unauthorized resources, OSID is updated regularly and the successfully accessed OSID is immediately disabled. In other words, it is possible to realize high robustness, which is one of the important factors in the operation of the guest OS in the virtualization system. Also, even if OSID is updated frequently, the hypervisor implemented by the software is only involved in the initialization of OSID, and OSID manager manages the updating of OSID so that the performance of the system is not degraded.

Second Embodiment

Figure 3:
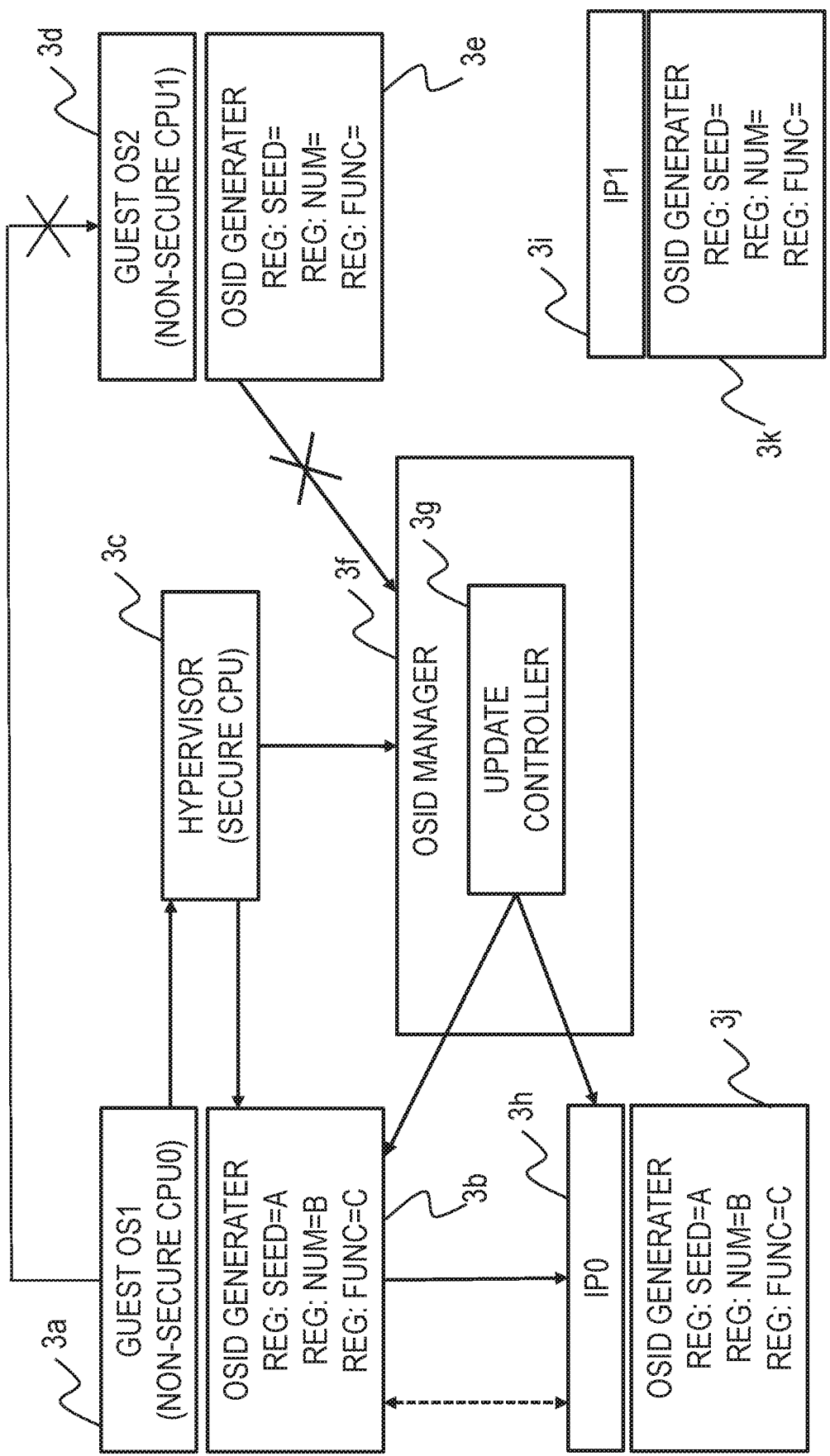
FIG. 3 is a configuration diagram of a virtualization system according to the second embodiment.

FIG. 3 is a block illustrating an overall configuration of a virtualization system according to the second embodiment. It consists of a hypervisor (3*c*) running on a secure CPU, a guest OS1 (3*a*) running on a non-secure CPU, a guest OS2 (3*d*) running on a non-secure CPU, an OSID manager (3*f*), an update controller (3*g*) in the OSID manager (3*f*), an OSID generator (3*b*) in the guest OS1 (3*a*), an OSID generator (3*e*) in the guest OS2 (3*e*), IP1 (3*i*), IP0 (3*h*), an OSID generator (3*j*) in the IP0 (3*h*), an OSID generator (3*k*) in IP1 (3*i*) and a resource such as memory managed by OSID generator (3*j*, 3*k*) (not shown). The second embodiment has a different configuration form first embodiment in that where OSID generator is arranged.

In the second embodiment, as compared to the first embodiment, OSID generator is disposed inside guest OS and IP. In addition, OSID generator generates and uses OSID based on parameters such as seeds (variables) and calculate functions received from OSID, so that OSID itself is not retained internally.

(Update Flowchart of OSID)

Figure 4:
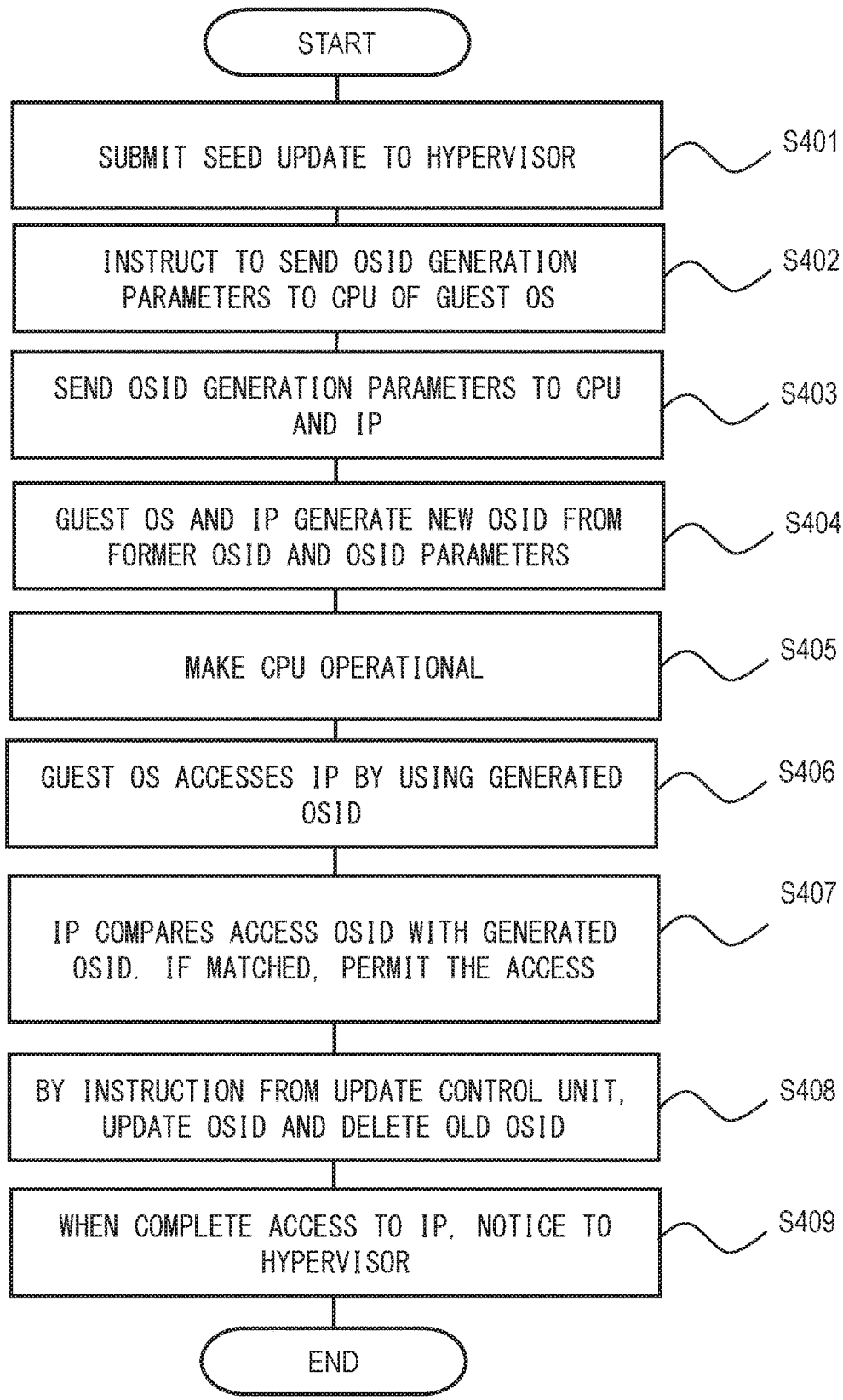
FIG. 4 is a flowchart of updating OSID in the virtualization system according to the second embodiment.

Specifically, refreshing OSID in present embodiment will be described with reference to FIG. 4. The guest OS1 (3*a*) running on non-secure CPU0 submits a seed update to a hypervisor (3*c*) running on a secure CPU when a new resource is needed or OSID count is exhausted (S401). A seed includes variables used to create OSID. The hypervisor (3*c*) instructs an OSID manager (3*f*) to send OSID generation parameters (seed, calculation function, number of generated, etc.) to CPU0 in which the guest OS1 (3*a*) is running (S402). The OSID manager (3*f*) sends OSID generation parameters to CPU0 and IP0 (3*h*) (S403). The guest OS1 (3*a*) and IP0 (3*h*) generate new OSID from OSID generation parameter and the previous OSID by OSID generator (3*b*, 3*j*) which are arranged internally. In other words, the guest OS1 (3*a*) and IP0 (3*h*) calculate the newly used OSID by a predetermined function (e.g., a function for calculating OSID generation parameters) based on an instruction from the OSID manager (3*f*), based on the parameters (e.g., seeds of OSID generation parameters) and OSID used immediately before. The OSID manager (3*f*) makes CPU0 operational (S405).

The guest OS1 (3a) uses the generated OSID to request IP0 (3h) to access the resource (S406). The IP0 (3h) uses the generated OSID to manage access to the resource (S407). The OSID for the access request is compared with the generated OSID, and if they are the same, the access request is accepted. The update controller (3g) periodically (at a predetermined timing) instructs the guest OS1 (3a) and IP0 (3h) to update OSID. The OSID generator (3b) and OSID generator (3j) periodically generate OSID and update OSID that has been generated by the instruction from the update controller (3g). The old OSID is deleted and disabled if OSID was updated (S408). It should be noted that OSID should not be updated while CPU0 is locked by some kind of process. The guest OS1 (3a) notifies the hypervisor (3c) of completion when the request of resource to IP0 (3h) is completed (S409).

Effect of Second Embodiment

In the second embodiment, since OSID to be retained is generated by OSID generator each time both the guest OS and the IP (resource), there is no need to retain OSID itself, and OSID can be completely concealed. Moreover, since the data held by the guest OS and the IP (resource) are only parameters for OSID generation, even if the parameters are stolen, it is impossible to generate an OSID unless the algorithm for generating OSID is clarified, and high-robustness can be realized.

Third Embodiment

Figure 5:
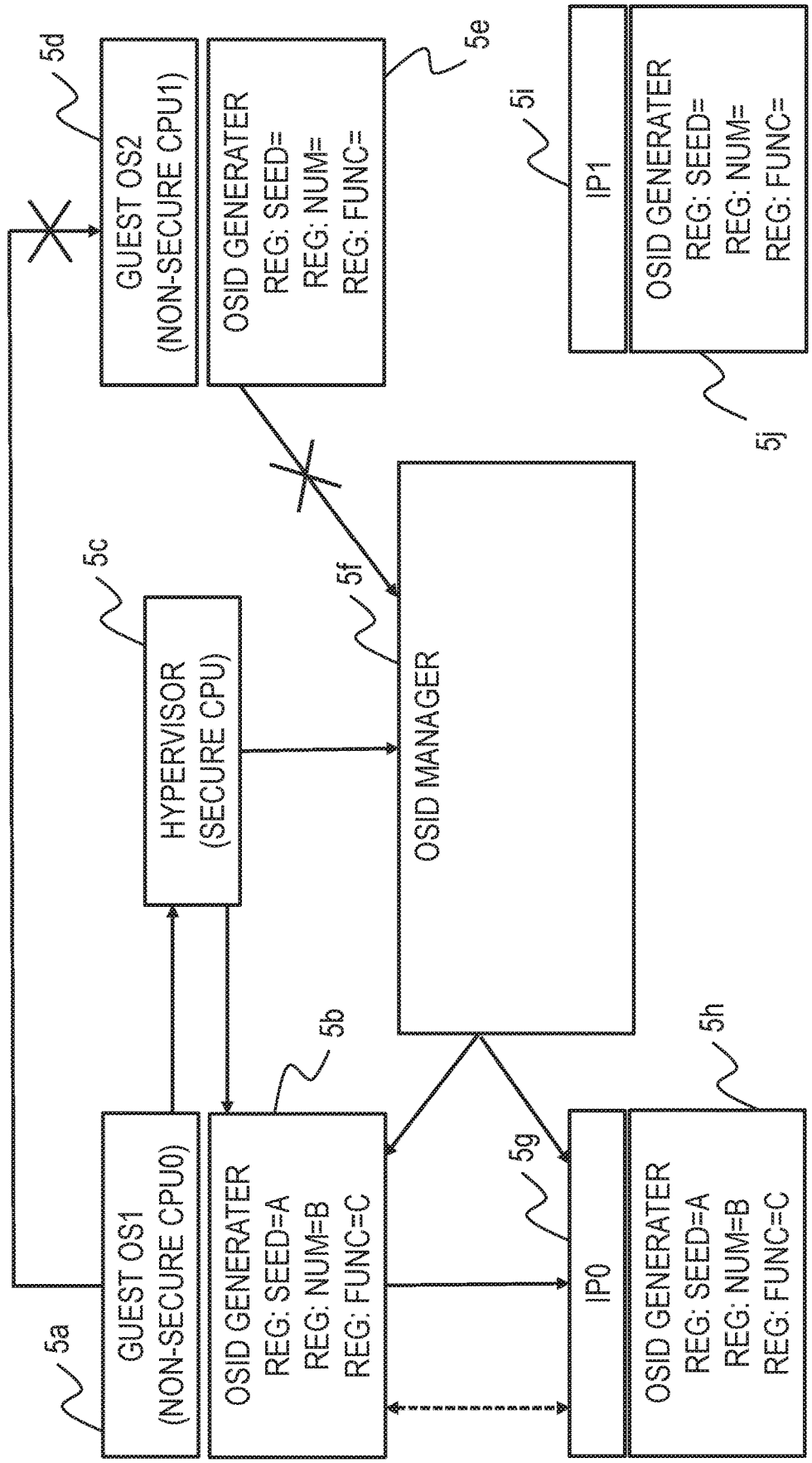
FIG. 5 is a configuration diagram of a virtualization system according to a third embodiment.

FIG. 5 is a block showing the overall configuration of the virtualization system according to the third embodiment. A hypervisor (5c) running on a secure CPU, a guest OS1 (5a) running on a non-secure CPU, a guest OS2 (5d) running on a non-secure CPU, an OSID generator (5b) in the guest OS1 (5a), an OSID generator (5e) in the guest OS2 (5d), an OSID manager (5f), an IP0 (5g), an IP1 (5i), an OSID generator (5h) in the IP0 (5g), an OSID generator (5j) in the IP1 (5i), and a resource managed by a IP0 (5b) such as memory (not shown). The third embodiment has a different configuration from the first embodiment in that where OSID generator is arranged. Further, the third embodiment has a different configuration from the second embodiment in that there is no update controller.

In the third embodiment, the updating instruction by OSID manager is unnecessary. As in the second embodiment, OSID generator is located inside the guest OS and the resource, and generates OSID according to the parameters from OSID manager. The guest OS accesses the resource by updating OSID at predetermined intervals (at a predetermined timing) such as every access or every 10 accesses, for example. OSID is updated in the same way when the number of accesses is counted and the predetermined update timing is reached. The refresh interval is preset by OSID manager.
(Update Flowchart of OSID)

Figure 6:
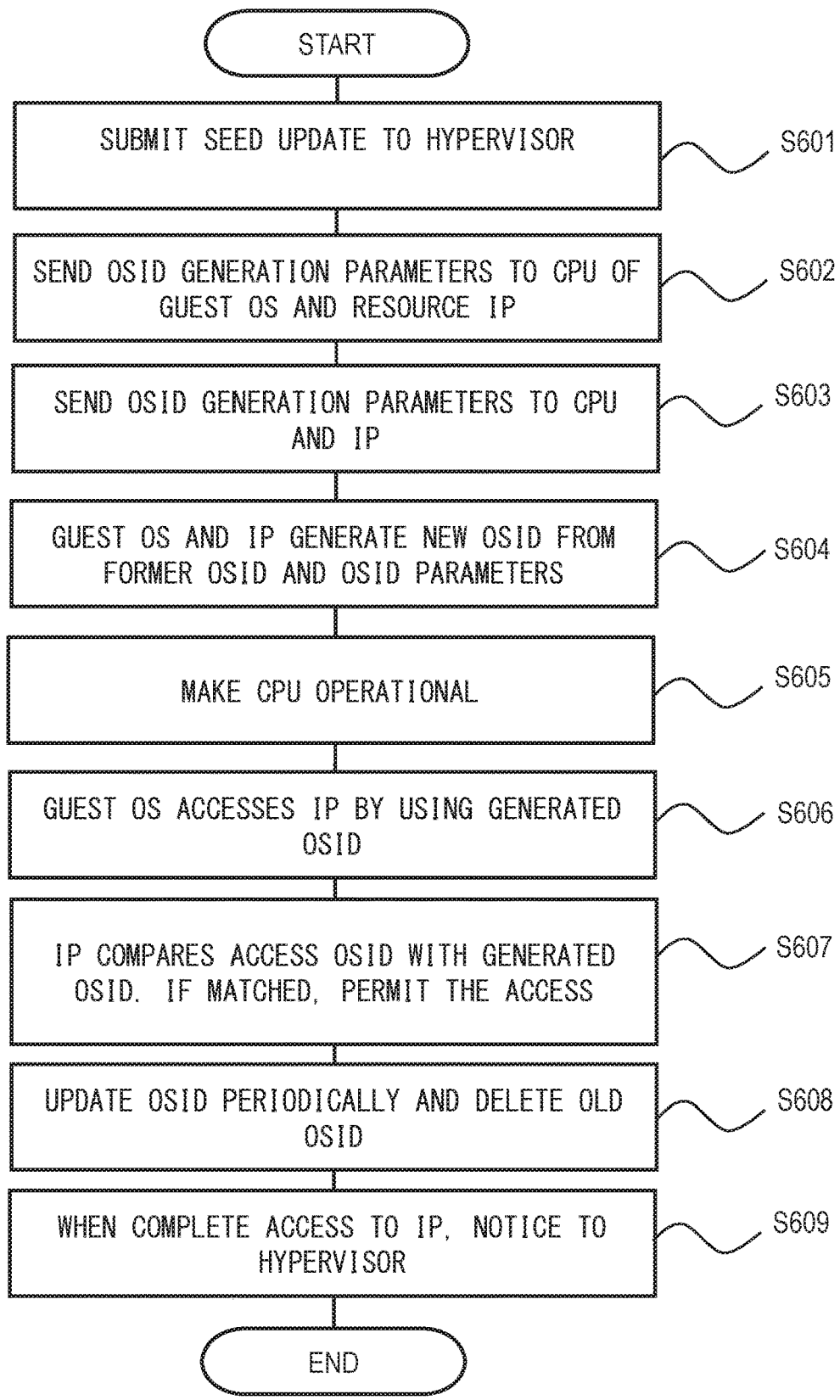
FIG. 6 is a flowchart for updating OSID in the virtualization system according to the third embodiment.

Specifically, with reference to FIG. 6, the flowchart of updating OSID in the present embodiment will be described. The guest OS1 (5a) running on non-secure CPU0 submits a request of seed update to a hypervisor (5c) running on a secure CPU when a new resource is needed or OSID count is exhausted (S601). A seed includes variables used to create OSID. The hypervisor (5c) instructs OSID manager (5f) to send OSID generation parameters (seed, calculation function, number of generated, etc.) to CPU0 in which the guest OS1 (5a) is running (S602). The OSID manager (5f) sends OSID generation parameters to CPU0 and IP0 (5g) (S603).

The guest OS1 (5a) and IP0 (5g) generate new OSID from OSID parameter and the previous OSID by OSID generator (5f) and the OSID generator (5h) which are arranged internally. In other words, the guest OS1 (5a) and IP0 (5g) calculate the newly used OSID by a predetermined function (e.g., a function for calculating OSID generation parameters) based on the parameters (e.g., seeds of OSID generation parameters) and OSID used immediately before. The OSID generation parameters become enable CPU0 (S605).

The guest OS1 (5a) uses the generated OSID to manage access to resources (S606). The IP0 (5g) uses the generated OSID to manage access to the resource (S607). The OSID of the access request is compared with the generated OSID, and if they are the same, the access request is accepted. In OSID generator (5b) and OSID generator (5h) arranged inside the guest OS1 (5a) and IP0 (5g), OSID is generated at a predetermined timing, and the stale OSID is erased and disabled (S608). As a predetermined timing, when the number of times the guest OS1 (5a) requested to access IP0 (5g) reaches a predetermined value, whereas when the number of access requests from the guest OS1 (5a) reaches a predetermined number of times, OISD may be updated. OSID should not be updated while the CPUs are locked. The guest OS1 (5a) notifies the hypervisor (5c) of completion when resource-requesting to IP0 (5g) is completed (S609).

Effect of Third Embodiment

In the third embodiment, the access from the guest OS to the IP (resource) is an order-guaranteed access, and by determining the update timing based on this access, the access can be made accessible without inconsistent OSID even if there is no update instruction from OSID manager. Further, since OSID manager does not need to perform updating control for the respective guest OSs and IPs (resources), frequent periodic updating of OSID can be performed without complicated control even when the number of control targets increases.

First Modified Example

For example, there is a way to simplify the function of OSID generating part. In the second and third embodiments, the OSID generators inside the guest OS and IP generate OSID, but instead of providing OSID generator, OSID storage table can be retained. The OSID manager stores OSID in OSID storage table and sequentially updates OSID in the table at a predetermined update timing. For example, guest OS1 (3a, 5a) and IP0 (3h, 5g) are generated from OSID storage table as the allocation information table based on the parameters and OSID used immediately before based on the instruction from OSID manager (3f, 5f). If OSID reaches the end of the table, it should return to the beginning at the next refresh timing. In this method, a simpler configuration and more robust virtualization system can be constructed than with an OSID generator.

Second Modified Example

Figure 7:
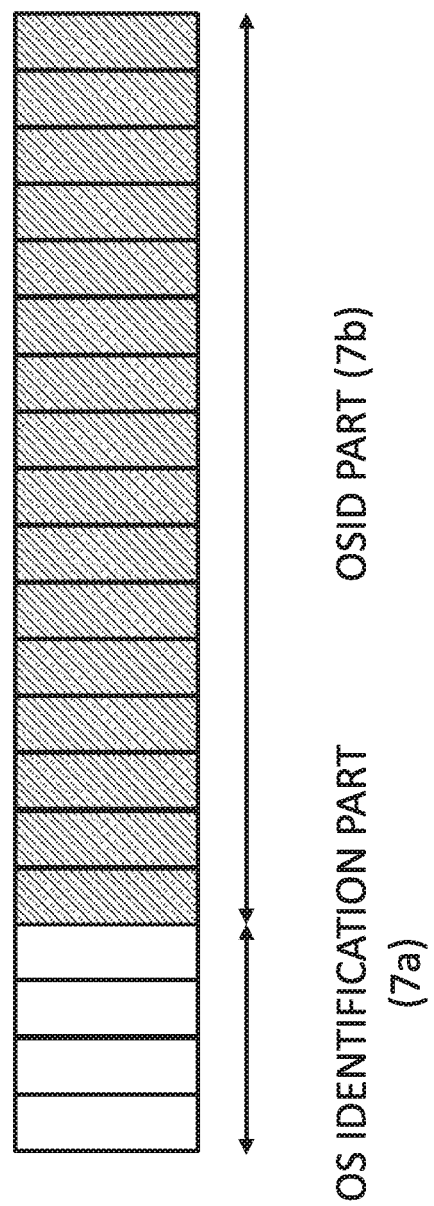
FIG. 7 is a configuration diagram of a OSID according to second modified example.

When OSID generator in above embodiments individually generates an OSID, there is a possibility that the generated OSID overlaps. To solve this problem, as shown in FIG. 7, OSID is configured by the OS identification part (7a) and OSID part (7b). The OS identification part (7a) stores a predetermined number for each guest OS. In the configuration example of FIG. 7, it is possible to support up to four OSs. When OSID is 16 bits, the bit position of the OS identification part (7a) and OSID of the OS allocated to each OS correspond to the OS identification part (7a), such as bit 0 being the guest OS0 and bit 1 being the guest OS1. By setting bit 0 of the OS identification part (7a) to "1", it is identified as an OSID for guest OS0. When access is permitted from multiple OSs, the corresponding bit position is set to "1" in the same way. For example, when only guest OS0 and guest OS3 are allowed, the OS identification part (7a) becomes "1001".

What is claimed is:

1. A virtualization system in a network compatible vehicle-mounted system, the virtualization system running a plurality of guest operating systems in a virtual environment, the virtualization system comprising:
a hypervisor that i) controls operations of the plurality of guest operating systems in the virtual environment and ii) manages parameters for generating allocation information indicating allocation of hardware resources of the virtualization system to the guest operating systems; and
a resource identifier that manages access to the hardware resources based on the allocation information,
wherein the hypervisor transmits the parameters to the guest operating systems and the resource identifier,
wherein the respective guest operating system generates an updated operating system identifier when a preset update timing interval has passed, and requests the resource identifier to access the hardware resources based on the operating system identifier,
wherein the resource identifier compares the updated guest operating system identifier with an operating system identifier stored in a register,
wherein the register stores an operating system identifier that is granted permission for access to the resource, and
wherein the resource identifier permits access if the updated guest operating system identifier matches the operating system identifier stored in the register.

2. The virtualization system according to claim 1, wherein the updated guest operating system identifier is generated based on an instruction from a control unit, by a predetermined function based on a seed parameter and the operating system identifier that has been used immediately before.

3. The virtualization system according to claim 1, wherein the updated guest operating system identifier is generated from an operating system identifier table based on a seed parameter and the operating system identifier used immediately before based on an instruction from a control unit.

4. The virtualization system according to claim 1, wherein the preset updated timing interval is a timing interval at which the guest operating system requests a predetermined number of hardware resources to the resource identifier.

* * * * *